United States Patent Office 2,726,788
Patented Dec. 13, 1955

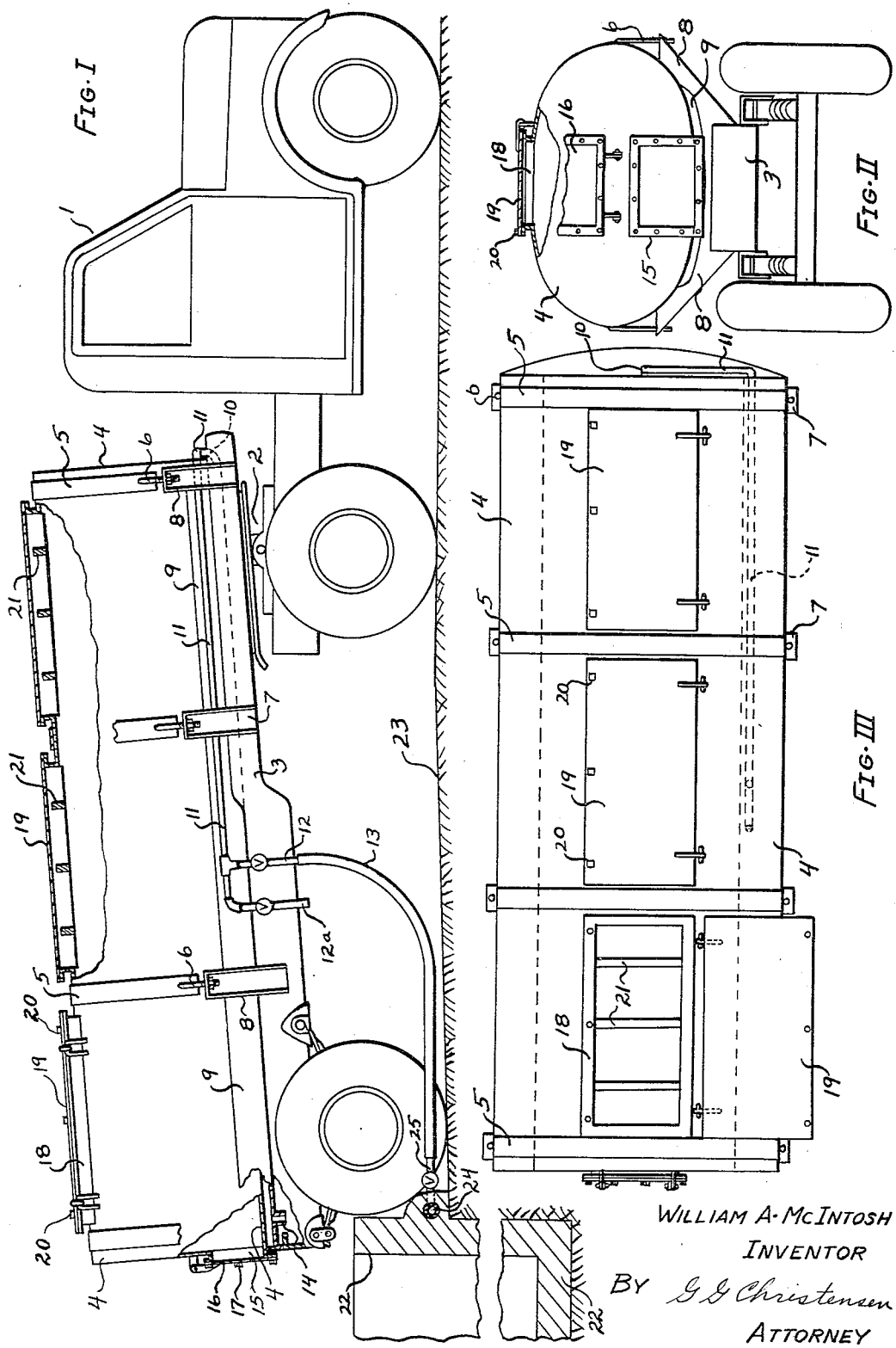

2,726,788

TRANSPORTABLE CONTAINER AND METHOD OF EMPTYING CRUDE OLEORESIN THEREFROM

William A. McIntosh, Valdosta, Ga., assignor to The Glidden Company, Cleveland, Ohio, a corporation of Ohio Application March 8, 1951, Serial No. 214,596

3 Claims. (Cl. 222—1)

This invention relates to apparatus adapted for the transportation and the unloading therefrom of crude oleo-resin, and relates particularly to a truck tank having arrangements and features of construction hereinafter described which facilitate the unloading of crude oleo-resin therefrom. The invention furthermore relates to a method for unloading crude oleo-resin from a container having a restricted discharge port therein.

The natural gum which is tapped from trees of certain varieties and which is collected and subsequently processed for rosin, turpentine and other components of the crude material is a very tacky, viscous semi-fluid which flows rather slowly even on warm days. These properties have made the material rather difficult to handle as a bulk material. Whenever the material had to be transported in the past, it would either be filled into open-end barrels or, in processing plants, would be conveyed by means of overhead clam-shell or dredge buckets. U. S. Patent No. 2,400,040, issued May 7, 1946, to McGarvey Cline, describes the use of the latter equipment for conveying the crude oleo-resin.

Under present methods of operation in some localities, the crude oleo-resin is brought by farmers or truckers in barrels to collecting stations which serve their local area. At the collecting station, the barrels are emptied according to grade into receiving vats or pits where different grades of the crude material are stored until a sufficient quantity has been accumulated for transportation to the nearest convenient processing plant. In the past such accumulated material has not been transported as a bulk commodity because of the difficulties involved in emptying it from any containers in which it might be so transported. I have now found, however, that the material can easily be run out of a truck tank, for example, by equipping the bottom portion of the tank with a jacket into which steam may be introduced to heat the bottom of the tank. By so heating the tank bottom, a thin film of fluid oleo-resin is formed at the bottom of the mass of oleo-resin. If then the tank is tipped so that its bottom is inclined slightly toward a discharge opening, the whole mass of oleo-resin flows readily through the discharge opening. In this manner it is now possible to empty a tank in a very short time without otherwise having to handle the the material. The invention makes it possible to employ conventional highway truck equipment for transporting the crude oleo-resin, once the tank has been equipped with a steam jacket.

Revolutionary changes in the purchasing and collection of crude oleo-resin have been made possible by the introduction of highway trucks equipped with tanks which employ the present invention. Previously, the oleo-resin farmer brought his full barrels of the crude material to a local purchasing depot or to the central processing plant where he was paid for the oleo-resin at current rates and according to grade. Clean, empty barrels were given to him in exchange for the full ones, so that he could take empty ones back to his farm with him. The barrels of crude material so purchased at the depot remote from the central processing plant were stored without being emptied, and in due course were picked up by trucks and transported to the central oleo-resin processing plant. There the barrels were emptied and steamed to clean them out, stored if necessary, and eventually were again loaded on trucks to be carried back to the various purchasing depots. At the height of the season, the processing plant and the purchasing depots necessarily maintained a large stock of clean empty barrels to facilitate the exchange operations described above, and the maintenance of such a stock together with the labor and other expense of cleaning, storing and distributing them back to the depots added appreciably to the total cost of doing business. Moreover, the central processing plant had to bear the cost of replacing barrels which in the course of time became unserviceable. Through the use of trucks capable of hauling the crude oleo-resin as a bulk material, the central processing plant no longer needs the large labor force previously necessary to receive, empty, clean, store and return the collecting barrels to the depots since practically all barrel handling operations are confined to the remote purchasing depots. The farmers own their own barrels and always receive them back as soon as their contents have been purchased and emptied at the purchasing depot. No stock of empty barrels is therefore needed, and the expense of transporting barrels back and forth between depots and the central plant is practically eliminated. Some of these various savings are, of course, offset by other costs involved in doing business by means of bulk tank trucks, but the new methods effect appreciable overall savings which accrue to the central processing plant. Thus it will be apparent that the provision of easily-unloaded tanks capable of carrying crude oleo-resin as a bulk material has produced a profound advance in the crude oleo-resin art.

The invention will be understood more fully from the following detailed description taken in conjunction with the attached drawings, in which:

Fig. I is a diagrammatic side elevational view of a semi-trailer-type tank truck equipped with a jacketed tank and positioned adjacent a receiving vat in an attitude convenient for unloading oleo-resin from the tank thereof. Parts of the tank have been broken away to better reveal constructional details thereof;

Fig. II is an elevational view of the discharge end of the tank of the truck of Fig. I, with the cover of the discharge opening thereof in open position;

Fig. III is a plan view of the tank of the truck of Fig. I, the view showing one of the filling hatchways in open position.

Referring now to Fig. I, a semi-trailer-type highway truck is shown there consisting of a conventional tractor unit 1 connected through a suitable fifth-wheel 2 to the frame 3 of a semi-trailer. A tank 4 is carried on the frame of the trailer being secured thereto by metal bands 5, 5, bolts 6, 6 and brackets 7, 7, the brackets being rigidly secured to the frame 3 and to transverse plates 8, 8 which extend beneath the tank and bridge the frame 3 to provide a cradle on which the bottom surface of the tank rests. As shown in Figs. I and II, the bottom of the tank is fitted with a metal jacket 9 which extends from one end of the tank to the other and extends sidewise so as to cover approximately the bottom one-third of the tank. The jacket is suitably secured to the tank, as by welding or otherwise, and the ends of the jacket are also closed by suitable metal plates, all to the end that the jacket is capable of confining low pressure steam therewithin to heat the bottom of the tank. The front end of the jacket is provided with a steam inlet 10 which is connected in turn to a steam conduit 11 having a pair of valved nipples 12, 12a suitably secured to the trailer frame 3 at a location convenient for attaching to one of the nipples a flexible steam hose 13. Near the rear end of the jacket is an open steam outlet 14, which also serves as a drain port for water which condenses in the jacket. The rear end of the tank 4 is provided adjacent its bottom wall with a rectangular discharge port 15. A cover plate 16, which is hingedly secured to the end wall of the tank, covers the discharge port 15 and is secured thereto by means of a plurality of screws 17, 17. A gasket (not shown) may be provided and disposed between the cover plate and the mating surface of the discharge port to prevent leakage from the port when the cover plate has been tightly secured thereto. The top of the tank is provided with three loading hatches 18, 18 fitted with hinged covers 19, 19 which may be fastened over the openings by any suitable means, as by screws 20, 20. The loading hatches are fitted with a plurality of transverse bars 21, 21 suitably spaced along the length of each opening to provide a grating on which barrels may be rested while being emptied into the tank.

When a load of crude oleo-resin is to be emptied from the tank, the trailer is backed against a suitable receiving pit 22, which is preferably a concrete pit having its bottom well below the level of the ramp 23, on which the tank truck is situated. The ramp is sloped downwardly adjacent the wall of the pit so as to cause the rear end of the tank to be at a lower elevation than the front end. A slope of about 2 to 3 feet in 20 feet has been found to be adequate. A steam conduit 24 provided with a valved nipple 25 and a flexible hose 13 is provided at any convenient location near the receiving pit to enable steam to pass therefrom to the steam jacket of the tank after the flexible hose 13 has been connected to one of the nipples 12, 12a carried on the trailer.

The unloading operations involve opening the discharge port by removing the screws 17, 17 which secure the cover 16 thereto. A latch, not shown, may be fastened to the cover 16 to cooperate with a latch plate on the tank to hold the cover in place while screws 17 are being removed. When the screws have all been removed, the latch may then be released to free the cover instantaneously. The operation of opening the discharge port may be done either before or after steam has been passed into the steam jacket of the tank. The steam hose 13 is connected to nipple 12, for example, the valves are opened and steam is passed through the jacket from the inlet 10 to the exhaust port 14. After the steam has been so applied for a period sufficiently long to heat the bottom of the tank and to liquefy a thin film of the crude oleo-resin lying adjacent thereto, the crude material begins to flow out of the open discharge port 15 into the receiving pit 22. Additional steam may be introduced while the material is being so discharged to ensure the maintenance of a fluid film of crude oleo-resin under any of the crude material remaining in the tank. When substantially all of the crude material has been discharged, the steam is discontinued, the steam hose 13 is disconnected, and the operator may then climb on top of the tank and by means of a long-handled hoe or rake, worked through the loading hatches 18, 18, scrape the tank bottom clean to remove any bark, trash or solid pieces of crude oleo-resin which remain therein. The operator may then move the truck away from the receiving pit, after which he secures the cover 16 to the discharge port 15, and secures the covers 19, 19 over the loading hatches 18, 18. The truck is then ready to proceed after another load of crude oleo-resin.

While I have described one specific embodiment of my invention in detail, it will be understood that many variations may be made therein without departing from the principles of my invention. For instance, the tank may be so constructed that its bottom slopes toward the discharge opening at a sufficient grade to enable the crude oleo-resin to be discharged when the wheels of the trailer and tractor are on level ground. Or the tank may be of the type shown in the drawings, but may be so mounted on the trailer as to have the required slope when the trailer outfit stands on level ground. Moreover, other means may be employed to obtain the slope necessary for discharging the crude oleo-resin. For instance, the front end of the trailer may be disconnected from the tractor and suspended by an overhead hoist. The hoist may then be manipulated to tilt the tank as much as may be necessary. Or alternatively the tank may be mounted on the trailer frame in the manner of a conventional dump truck body; that is, pivoted at the rear end, and capable of being lifted at the front end by an hydraulic or mechanical lifting device mounted under the tank on the trailer frame. It will also be understood that a trailer outfit is not the only type of vehicle on which the tank may be employed with or without any of the foregoing variations. The tank may be mounted on a four-wheel trailer, it may be on a conventional truck chassis, or on railway car trucks. Moreover, a railway tank car may be fabricated so as to employ the principles herein described.

It will also be understood that the length and cross-sectional shape of the tank may be altered to suit one's needs. Moreover, the tank may be equipped with removable partitions spaced along its length, so that several different grades of crude oleo-resin may be carried in one tank. When such partitions are employed, the chamber nearest the discharge port is emptied first, then the partition at the forward end of that chamber may be removed, after which the next chamber is emptied through the discharge port, and so on until the whole tank has been emptied.

It will also be understood that the steam jacket may be replaced with steam coils which are fastened to the outside of the tank, or which may be merely disposed in close proximity thereto. Moreover, any other suitable means for heating the bottom of the tank may be employed, as, for example, gas burners, hot air blasts, hot water jets, or streams, etc. impinging directly on the metal bottom of the tank. The construction shown in the drawings is, however, the construction which I prefer to employ, since I have found it to be very convenient, serviceable and expeditious, and to minimize the danger of setting fire to the crude oleo-resin, which, when ignited, burns readily.

In summary, it will be recognized that my invention provides a simple and inexpensive method and apparatus for unloading bulk crude oleo-resin from a container through a restricted orifice or discharge port in the container, the main characteristic of the method being that the whole mass of crude oleo-resin may be caused to discharge through the orifice in an unheated condition by merely melting or liquefying a very small portion of it, e. g. that portion which is in direct contact with the bottom of the container and which may be considered to be subjected to a major part of the weight of the entire mass of material. Such layer functions to lubricate the unheated mass and to enable it to move by gravity toward and through the discharge port.

Having now described my invention, what I claim is:

1. The method of emptying crude oleo-resin in substantially unheated condition from a container having bottom confining walls inclined toward a discharge port of restricted area disposed in the vicinity of the lowermost portion of said container, said method comprising the steps of: forming by means of external heat applied to portions of said bottom confining walls a thin film of liquefied crude oleo-resin between said mass of crude material in unheated condition and said heated walls, whereby said liquefied film functions as a lubricant between said crude material and said heated walls and enables the unheated mass of crude material to move by gravity toward said discharge port when the latter is open; discharging crude material from said container through said port, and during the discharge of material therefrom until the container has been substantially emptied, continuously maintaining by application of said external heat a thin film of liquefied crude oleo-resin between said heated walls and the mass of crude materials which remains in the container in unheated condition.

2. The method of emptying crude oleo-resin in substantially unheated condition from a container having supporting surface for said material inclined toward a discharge opening of restricted area disposed in the vicinity of the lowermost portion of said container, said method comprising the steps of initially forming and thereafter continuously maintaining by means of external heat applied to the major part of the supporting surface of said container a thin film of liquefied crude oleo-resin upon said heated supporting surface while retaining the remainder of said mass of crude material in an unheated condition, whereby said liquefied film functions as a lubricant between said crude material and said heated surface and enables the unheated mass of crude material under the influence of gravity to slide toward and to discharge through said discharge opening.

3. Dispensing mechanism comprising a wheel-supported container having an inclined surface and confining walls, the confining wall adjacent the lower end of said inclined surface having an opening at the lower end thereof, removable closure means for closing said opening, means for heating said inclined surface, a relatively thin layer of crude oleo-resin resting on said inclined surface and maintained at a temperature above ambient temperature by said heating means, said container being adapted to contain a mass of oleo-resin at ambient temperature resting on said layer and confined between said confining walls, whereby, when said closure means is removed, said mass of oleo-resin will slide towards said opening, over said layer, which acts as a lubricant for said mass, and be discharged by gravity through said opening.

References Cited in the file of this patent

UNITED STATES PATENTS

| Number | Name | Date |
|---|---|---|
| 178,491 | Warren | June 6, 1876 |
| 597,631 | Boutilier | Jan. 18, 1898 |
| 661,380 | Mordan et al. | Nov. 6, 1900 |
| 754,135 | Grubitz | Mar. 8, 1904 |
| 1,033,131 | Van Alstyne | July 23, 1912 |
| 1,051,832 | Dunn | Jan. 28, 1913 |
| 1,157,749 | Young | Oct. 26, 1915 |
| 1,562,991 | Rudigier | Nov. 24, 1925 |
| 1,705,649 | Scott | Mar. 19, 1929 |
| 1,897,165 | Endacott et al. | Feb. 14, 1933 |
| 1,936,584 | Cobb | Nov. 28, 1933 |
| 2,136,738 | Giordano | Nov. 15, 1938 |
| 2,472,594 | Kuehn | June 7, 1949 |